United States Patent [19]

Ishida et al.

[11] Patent Number: 5,151,457
[45] Date of Patent: Sep. 29, 1992

[54] RESIN COMPOSITIONS HAVING IMPROVED ANTISTATIC PROPERTIES

[75] Inventors: Yuzuru Ishida; Haruo Inoue, both of Kanagawa; Ichiro Otsuka, Tokyo; Masato Takaku, Osaka; Masahiro Mitsuboshi; Keiji Iio, both of Kanagawa; Atsushi Hashimoto, Osaka, all of Japan

[73] Assignee: Mitsui Toatsu Chemicals, Inc., Tokyo, Japan

[21] Appl. No.: 796,918

[22] Filed: Oct. 22, 1991

Related U.S. Application Data

[63] Continuation of Ser. No. 593,066, Oct. 5, 1990.

[30] Foreign Application Priority Data

| Oct. 9, 1989 | [JP] | Japan | 1-262207 |
| Feb. 23, 1990 | [JP] | Japan | 2-41118 |
| May 24, 1990 | [JP] | Japan | 2-132712 |
| Jul. 4, 1990 | [JP] | Japan | 2-175171 |

[51] Int. Cl.$^5$ ............ C08K 5/42; C08K 5/06; C08F 220/18; C08F 212/08
[52] U.S. Cl. ............ 524/157; 524/366; 526/329.2; 526/347
[58] Field of Search ............ 524/423, 156, 157

[56] References Cited

U.S. PATENT DOCUMENTS

| 4,542,095 | 9/1985 | Steklenski et al. | 430/527 |
| 4,585,730 | 4/1986 | Cho | 430/527 |
| 4,699,964 | 10/1987 | Kato et al. | 526/193 |
| 4,857,590 | 8/1989 | Gaggar et al. | 525/64 |
| 4,957,947 | 9/1990 | Chen et al. | 522/66 |

FOREIGN PATENT DOCUMENTS

| 717866 | 7/1968 | Belgium . |
| 294722 | 12/1988 | European Pat. Off. . |
| 2-233743 | 9/1990 | Japan . |

OTHER PUBLICATIONS

Derwent Publications Ltd., Database WPIL No. 90-325212, Mitsui Toatsu Chemicals, Inc.), Sep. 17, 1990.

*Primary Examiner*—Joseph L. Schofer
*Assistant Examiner*—Wu C. Cheng
*Attorney, Agent, or Firm*—Burns, Doane, Swecker & Mathis

[57] ABSTRACT

A resin composition having excellent antistatic properties and practical physical properties. The resin comprises (i) a styrene resin; (ii) a polyethylene oxide having a viscosity-average molecular weight ranging from 15,000 to 1,200,000; (iii) either or both of a (meth) acrylate resin and an oxide selected from the group consisting of titanium oxide, zinc oxide and magnesium oxide; (iv) either a surfactant selected from specific sulfonic acid salts or a surfactant selected from specific alkyl sulfates; and, optionally, (v) a (poly)ethylene glycol having an average molecular weight ranging from 62 to 1,200. The resin composition also provides excellent resistance to hot water.

23 Claims, No Drawings

RESIN COMPOSITIONS HAVING IMPROVED ANTISTATIC PROPERTIES

This application is a continuation, of application Ser. No. 07/593,066, filed Oct. 5, 1990.

BACKGROUND OF THE INVENTION (a) Field of the Invention

The present invention relates to a resin composition having excellent practical physical properties and antistatic properties.

(b) Description of the Prior Art

In general, general-purpose resins such as styrene resins and acrylic resins have been widely used in electric, electronic parts because of their excellent electrical insulation properties.

In addition, general-purpose resins have been widely used in fields where electrical insulation properties are not always needed because they show well-balanced properties such as mechanical strength, heat resistance and molding and processing properties. When these general-purpose resins are employed in those fields where electrical insulation properties are not always needed, various problems arise because they have such good electrical insulation properties. For instance, they are easily charged due to friction and contact. As a result they absorb dust which impairs the appearance thereof causes dielectric breakdown of integrated circuits (IC) or the like in which such resins are employed. In addition, there is often observed the so-called dropout phenomenon which is due to charging of a container made of such a resin for a magnetic recording material. Hence the absorption of dust becomes conspicuous with the recent increase in the density of magnetic recording materials. This is a serious problem in the field.

In order to solve this problem, attempts have been made to reduce the surface intrinsic resistance by kneading a low molecular weight surfactant as an antistatic agent with the general-purpose resin, or by applying a surfactant onto the surface of the resulting molded product.

Generally, when an antistatic agent is kneaded with a styrene or acrylic resin, the antistatic effect can be maintained as long as the antistatic agent is present on the resin surface. However, since most of the antistatic agent present in the bulk of the resin is not on the surface of the resin, the antistatic effect of the resin is substantially reduced if the antistatic agent is washed with water or wiped with a cloth from the resin surface. Moreover, it is necessary to knead the antistatic agent with the resin, or apply it to the surface thereof, in relatively large amounts. This makes the surface of a molded product sticky.

To solve this problem, Japanese Patent Application Serial No. Hei 1-53721 proposes a resin composition which comprises a styrene resin, a polyethylene oxide having a specific molecular weight and a sulfonate having a specific chemical structure. This composition has already been put to practical use. However, the resin composition suffers from a problem of blushing which is observed when the composition is brought into contact with hot water over long periods of time. It has long been desired to develop a means for solving this problem in fields where the use of resin materials having resistance to hot water is required.

SUMMARY OF THE INVENTION

The inventors of this invention have conducted intensive studies to solve the foregoing problems associated with the conventional general-purpose resins. They have discovered that the problems can effectively be addressed by providing a resin composition which comprises a styrene resin, a polyethylene oxide having a specific viscosity-average molecular weight, a specific agent for improving resistance to hot water and a specific surfactant. Optionally, a specific (poly)ethylene glycol can be included.

According to one aspect of the present invention, there is provided a resin composition which can provide excellent antistatic properties. The composition comprises:

(i) a styrene resin selected from the group consisting of homopolymers of a styrene compound selected from the group consisting of styrene and derivatives thereof, copolymers of at least two such styrene compounds and copolymers of a styrene compound with other copolymerizable monomers;

(ii) a polyethylene oxide having a viscosity-average molecular weight ranging from 15,000 to 1,200,000, in an amount ranging from 3 to 35 parts by weight per 100 parts by weight of the styrene resin;

(iii) either or both of a (meth)acrylate resin, in an amount ranging from 4 to 100 parts by weight per 100 parts by weight of the styrene resin and an oxide selected from the group consisting of titanium oxide, zinc oxide and magnesium oxide, in an amount ranging from 0.7 to 5 parts by weight per 100 parts by weight of the sum of the components (i) and (ii); and (iv) either a surfactant selected from sulfonic acid salts represented by the following general formula:

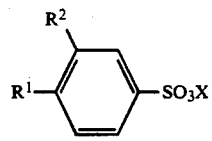

wherein $R^1$ and $R^2$ each represents a hydrogen atom or an alkyl group having not more than 12 carbon atoms and X represents at least one alkali metal selected from the group consisting of Na, Li and K or an alkyl sulfate represented by the following general formula:

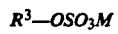

wherein $R^3$ represents an alkyl group having 8 to 20 carbon atoms and M represents at least one ion selected from the group consisting of K, Na and NH', in an amount ranging from 0.4 to 5 parts by weight per 100 parts by weight of the sum of the components (i), (ii) and (iii).

According to another aspect of the present invention, there is provided a resin composition which comprises, in addition to the aforementioned components (i)–(iv), the following component (v):

(v) a (poly)ethylene glycol having an average molecular weight ranging from 62 to 1,200, in an amount ranging from 0.05 to 5 parts by weight per 100 parts by weight of the sum of the components (i), (ii) and (iii).

DESCRIPTION OF THE PREFERRED EMBODIMENTS

The styrene resin used in the present invention is selected from the group consisting of homopolymers of a styrene compound selected from the group consisting of styrene and derivatives thereof, copolymers of at least two such styrene compounds and copolymers of such a styrene compound with another copolymerizable monomer. Examples of the styrene compounds are styrene; styrenes having a side chain substituted with an alkyl group such as α-methylstyrene and α-ethylstyrene; styrenes having a substituent on the benzene nucleus such as vinyltoluene and p-methylstyrene; and halogenated styrenes such as monochlorostyrene, dichlorostyrene, tribromostyrene and tetrabromostyrene and particularly preferred are styrene and α-methylstyrene. In the present invention, these styrene compounds may be used alone or in combination. In addition, other copolymerizable monomers may optionally be used simultaneously with the foregoing styrene compounds to form styrene copolymers and examples thereof are acrylonitrile monomers such as acrylonitrile, methacrylonitrile and fumaronitrile; maleimide monomers such as maleimide, N-methylmaleimide and N-phenylmaleimide; (meth)acrylate monomers such as methyl acrylate and methyl methacrylate; and maleic acid monomers such as maleic acid and maleic anhydride.

The foregoing styrene resins may be modified with a rubbery polymer such as polybutadiene, styrene-butadiene copolymer, butadiene-acrylonitrile copolymer, ethylenepropylene-diene copolymers and butadiene-acrylate copolymers.

These rubbery polymers can be dispersed in the rubber-modified styrene resins in the form of particles and form a dispersion phase (hereinafter referred to as a "microgel"). On the other hand, the styrene resin can be a continuous phase (or a matrix phase). The microgel also comprises a styrene resin which is grafted to or included in the microgel. When such a polymer mixture is observed by an electron microscope, the microgels are present like islands dispersed in a matrix phase of a styrene resin.

The styrene resins used in the present invention may be prepared according to any known methods such as bulk polymerization, suspension polymerization or emulsion polymerization.

The polyethylene oxides used in the present invention are those having a viscosity-average molecular weight ranging from 15,000 to 1,200,000. If the viscosity-average molecular weight thereof is less than 15,000, the polyethylene oxide has good compatibility with the styrene resin, but provides insufficient antistatic effect. If it exceeds 1,200,000, the compatibility with the styrene resin is insufficient, and the resulting molded product peels off in thin layers, and its mechanical strength and antistatic properties are impaired. Thus, the polyethylene oxide used in the present invention should have a viscosity-average molecular weight preferably ranging from 20,000 to 1,000,000; more preferably 50,000 to 500,000 and most preferably 100,000 to 300,000.

The term "viscosity-average molecular weight" is defined as follows:

First relative viscosity ($\eta_{rol} = \eta/\eta_o$) is calculated from the viscosity ($\eta_o$) of pure water determined at 30° C. and the viscosity ($\eta$) of an aqueous solution of a polyethylene oxide; then specific viscosity ($\eta_{sp}$) is obtained according to the following relation:

$$\eta_{sp} = \eta_{rol} - 1$$

Thereafter, the specific viscosity ($\eta_{sp}$) is divided by each concentration of the aqueous solution of polyethylene oxide (C, grams per 100 ml of the aqueous solution) to obtain reduced viscosity ($\eta_{rod} = \eta_{sp}/C$) values. Subsequently, every reduced viscosity value ($\eta_{rod}$) obtained for the corresponding concentrations (C) was plotted against C and the resulting curve is extrapolated to C=0 (infinitely diluted solution) to obtain the intrinsic viscosity ([$\eta$]).

The viscosity-average molecular weight ($M_v$) can thus be calculated from the following equation:

$$[\eta] = 1.25 \times 10^{-4} M_v^{0.73}$$

Methods for preparing the polyethylene oxide are not particularly limited and commercially available polyethylene oxides having viscosity-average molecular weights which fall within the range defined above may be used in the invention. In this respect, a polyalkylene oxide or a derivative thereof other than polyethylene oxide (such as polypropylene glycol, methoxy polyethylene glycol, polyethylene glycol monooctyl ether, polyethylene glycol monostearate or polyethylene glycol monolaurate) do not show a sufficient antistatic effect and, therefore, the desired effect cannot be obtained if they are employed.

The amount of the polyethylene oxide to be incorporated into the resin composition of the present invention ranges from 3 to 35 parts by weight, preferably 5 to 20 parts by weight based on the weight of the styrene resin. If the amount of the polyethylene oxide is less than 3 parts by weight, the intended antistatic effect is not ensured and absorption of dust is observed. On the other hand, if it exceeds 35 parts by weight, the mechanical strength of the resulting resin composition is substantially reduced. In particular, the reduction in impact resistance is conspicuous. Thus such a resin composition cannot be used for producing large-scale molded products such as electric and electronic parts.

(Meth)acrylate resins employed in the present invention are selected from the group consisting of homopolymers of (meth)acrylate monomers, copolymers of these (meth)acrylate monomers, copolymers of these (meth)acrylate monomers with other copolymerizable monomers. Examples of the (meth) acrylate monomers include alkyl methacrylates such as methyl methacrylate, ethyl methacrylate, propyl methacrylate and butyl methacrylate; and alkyl acrylates such as methyl acrylate, ethyl acrylate, propyl acrylate and butyl acrylate. Among these, particularly preferred is methyl methacrylate. The (meth)acrylate monomers may be used alone or in combination. Moreover, examples of other copolymerizable monomers are styrene, acrylonitrile, maleimide, acrylic acid, methacrylic acid and maleic anhydride.

The amount of (meth)acrylate resin to be added to the resin composition of the present invention ranges from 4 to 100 parts by weight, preferably 10 to 60 parts by weight per 100 parts by weight of the styrene resin. If the amount thereof is less than 4 parts by weight, the resulting resin composition has insufficient resistance to hot water and it causes blushing when contacted with hot water. On the other hand, if it exceeds 100 parts by weight, there is insufficient antistatic effect.

The oxides which are selected from the group consisting of titanium oxide, zinc oxide and magnesium oxide are not required to have any specific crystalline structure and/or particle size. Those having any crystalline structure and/or particle size may be used in the invention as long as they have good compatibility with thermoplastic resins. The amount of the foregoing compounds in the resin composition ranges from 0.7 to 5 parts by weight and preferably 2 to 3 parts by weight per 100 parts by weight based on the sum of the foregoing styrene resin and the polyethylene oxide. If the amount thereof is less than 0.7 part by weight, the resulting resin composition provides insufficient resistance to hot water and causes blushing when it comes in contact with hot water. On the other hand, if the amount thereof exceeds 5 parts by weight, strength, in particular impact resistance, of the resulting resin composition decreases.

Specific examples of the sulfonic acid salts represented by the foregoing general formula include alkali metal salts of benzenesulfonic acid, toluenesulfonic acid, ethylbenzenesulfonic acid, propylbenzenesulfonic acid, isopropylbenzenesulfonic acid, n-butylbenzenesulfonic acid, isobutyl-benzenesulfonic acid, sec-butylbenzenesulfonic acid, t-butylbenzenesulfonic acid, pentylbenzenesulfonic acid, dodecylbenzenesulfonic acid, xylenesulfonic acid, ethyltoluenesulfonic acid, cymenesulfonic acid, t-butyltoluenesulfonic acid and diethylbenzenesulfonic acid. Examples of the alkali metal salts may be arbitrarily selected from Na, Li and K salts. Among the foregoing sulfonic acid salts, particularly preferred is sodium dodecylbenzenesulfonate from the viewpoint of antistatic properties of the resulting resin composition.

The amount of the sulfonic acid salt to be added to the resin composition ranges from 0.4 to 5 parts by weight, preferably 0.7 to 3 parts by weight per 100 parts by weight of the weight based on the sum of the styrene resin, the polyethylene oxide, the (meth)acrylate resin and/or the oxide. If the amount of sulfonic acid salt is less than 0.4 parts by weight, the antistatic properties of the resulting resin composition is insufficient. If it exceeds 5 parts by weight, the resin composition changes of color and the surface of the resulting molded product exhibits silver streaks when it is subjected to heat, for instance, in an extruder and/or a molder.

The alkyl sulfates represented by the foregoing general formula are potassium, sodium and ammonium sulfates carrying an alkyl group having 8 to 20 carbon atoms. Typical examples thereof are sodium octyl sulfate, sodium ethylhexyl sulfate, sodium undecyl sulfate, sodium dodecyl sulfate, potassium dodecyl sulfate, ammonium dodecyl sulfate, sodium hexadecyl sulfate and ammonium octadecyl sulfate. These alkyl sulfates may be used alone or in combination.

The amount of the alkyl sulfate to be added to the resin composition of the present invention ranges from 0.4 to 5 parts by weight, preferably 0.7 to 3 parts by weight per 100 parts by weight based on the sum of the foregoing styrene resin, the polyethylene oxide, the (meth)acrylate resin and/or the oxide. If the amount thereof is less than 0.4 part by weight, the antistatic properties of the resulting resin composition is insufficient. If it exceeds 5 parts by weight, the resin composition causes a change of color and the surface of the molded product exhibits silver streaks when it is subjected to heat, for instance, in an extruder and/or a molder.

The (poly)ethylene glycols usable in the present invention are those having an average molecular weight ranging from 62 to 1,200. Specific examples thereof are ethylene glycol, diethylene glycol, triethylene glycol and low molecular weight polyethylene glycols having an average molecular weight of 200, 300, 400, 600 or 1,000. These (poly)ethylene glycols may be used alone or in combination. If the average molecular weight of the (poly)ethylene glycol is outside the foregoing range, the antistatic properties of the resulting resin composition are insufficient. The amount of the (poly)ethylene glycol used ranges from 0.05 to 5 parts by weight, preferably 0.3 to 2 parts by weight per 100 parts by weight of the sum of the foregoing styrene resin, polyethylene oxide, (meth)acrylate resin and/or oxide. If the amount is less than 0.05 part by weight, the antistatic properties of the resulting resin composition are insufficient. If it exceeds 5 parts by weight, the heat resistance of the composition is lowered.

The resin composition of the invention may be prepared according to any methods and, for instance, it can be prepared by a method which comprises melting and mixing, in a mixer such as a single screw extruder, a twin screw extruder or a Banbury mixer, the components of the resin composition of the invention, i.e., a specific styrene resin, a polyethylene oxide, a (meth)acrylate resin and/or an oxide, a sulfonate or an alkyl sulfate and an optional ethylene glycol or a low molecular weight polyethylene glycol.

The resin composition of the present invention may include additional antistatic agents such as cationic, nonionic or anionic surfactants to impart even better antistatic properties to the composition.

In addition, the resin composition may include ordinary additives such as plasticizers, releasing agents, light-resistance-improving agents, antioxidants, flame retardants, coloring agents and stabilizers while maintaining the intended effects of the present invention.

The present invention will be described in more detail with reference to the following non-limitative working Examples. The effects practically achieved by the present invention will also be discussed in comparison with the following Comparative Examples.

In the following Examples and Comparative Examples, the following compounds and/or materials were employed.

Styrene resin: "SANTAC ST-42" available from MITSUI TOATSU CHEMICALS, INC.;

Polyethylene oxide: the following compounds each having a viscosity-average molecular weight put in parentheses:

"PEG 11000" available from Nippon Oil and Fats Co., Ltd. (10,000);

"PEG 20000" available from SANYO CHEMICAL INDUSTRIES, LTD. (20,000);

"ALKOX R-150" available from MEISEI CHEMICAL INDUSTRIES, LTD. (150,000; number-average molecular weight=100,000);

"ALKOX R-400" available from MEISEI CHEMICAL INDUSTRIES, LTD. (200,000);

"ALKOX R-1000" available from MEISEI CHEMICAL INDUSTRIES, LTD. (300,000; number-average molecular weight=200,000);

"ALKOX E-30" available from MEISEI CHEMICAL INDUSTRIES, LTD. (400,000);

"ALKOX E-45" available from MEISEI CHEMICAL INDUSTRIES, LTD. (600,000);

"ALKOX E-60" available from MEISEI CHEMICAL INDUSTRIES, LTD. (1,100,000; number-average molecular weight = 1,000,000);

A mixture of 80% by weight of "ALKOX E-60" and 20% by weight of "ALKOX E-75", both available from MEISEI CHEMICAL INDUSTRIES, LTD. (1,300,000); and "ALKOX E-75" available from MEISEI CHEMICAL INDUSTRIES, LTD. (2,200,000; number-average molecular weight = 1,500,000).

(Meth)acrylate resin: "PARAPET HR" available from Kyowa Gas Chemicals, Co., Ltd. and "PARAPET GF" available from KURARAY CO., LTD.

Titanium oxide: "Titanium Dioxide" (primary grade; anatase type one) available from Kanto Chemical Co., Ltd.; zinc oxide: "Zinc Oxide" (99.9%) available from Aldrich Chemical Company; and magnesium oxide: "Magnesium Oxide" (special grade) available from Kanto Chemical Co., Ltd.

Sulfonate: "NEWLEX POWDER F" (sodium dodecylbenzenesulfonate) available from Nippon Oil and Fats Co., Ltd.

Alkyl sulfate: "sodium n-dodecyl sulfate" (primary grade) available from Kanto Chemical Co., Ltd.

Ethylene glycol available from MITSUI TOATSU CHEMICALS, INC. and polyethylene glycols having the following average molecular weight (given in parentheses) and :

"PEG 200" available from Nippon Oil and Fats Co., Ltd. (200);

"PEG 1000" available from Nippon Oil and Fats Co., Ltd. (1000);

"PEG 4000" available from Nippon Oil and Fats Co., Ltd. (3000).

The physical properties of the resin compositions were determined according to the following techniques. To determine 1) Surface Intrinsic Resistance a resin composition to be examined was molded into a plate (test piece) of 4 cm × 4 cm × 2 mm (thickness) with an injection molding machine (cylinder temperature: 220° C.; mold temperature: 40° C.) and the surface intrinsic resistance was determined with an SM-10E Model Ultra-high Insulation Tester (available from TOA Electronics Ltd.) under the following conditions;

(a) "Immediately after Molding": Immediately after molding, the test piece was sufficiently washed with distilled water, the moisture on the surface was removed, and then the humidity of the test piece was adjusted by allowing it to stand at 20% RH and 10° C. for 24 hours (50% RH, 23° C. for 24 hours in Examples 1 to 9 and Comparative Examples 1 to 8) to determine the titled property.

(b) "After Allowing to Stand for 150 Days": After molding, the resulting test piece was allowed to stand at 50% RH and 23° C. for 150 days, sufficiently washed with distilled water, the moisture on the surface was removed, and then the humidity of the test piece was adjusted by leaving it to stand at 20% RH and 10° C. for 24 hours (50% RH, 23° C. for 24 hours in Examples 1 to 9 and Comparative Examples 1 to 8) to determine the property.

2) Notched Izod Impact Strength was determined according to ASTM D-256.

3) Vicat Softening Point was determined according to ASTM D-1525.

To determine 4) Appearance of Molded Product a resin composition was held within an injection molding machine (cylinder temperature = 240° C. ) for 3 minutes, then molded into a plate (test piece) of 4 cm × 4 cm × 2 mm (thickness) to evaluate the extent of change of color and the degree of silver streaks.

To determine 5) Resistance to Hot Water a resin composition to be examined was molded into a plate (test piece) of 4 cm × 4 cm × 2 mm (thickness) with an injection molding machine (cylinder temperature: 220° C. ; mold temperature: 40° C.) and the test piece was immersed in hot water of 60° C. for 2 hours to confirm whether blushing is observed on the surface thereof or not.

EXAMPLE 1

A mixture of 100 parts by weight of a styrene resin ("SANTAC ST-42" available from MITSUI TOATSU CHEMICALS, INC.), 10 parts by weight of a polyethylene oxide having a viscosity-average molecular weight of 300,000 (number-average molecular weight = 200,000) ("ALKOX R-1000" available from MEISEI CHEMICAL INDUSTRIES, LTD.), 40 parts by weight of a methyl methacrylate resin ("PARAPET HR" available from Kyowa Gas Chemicals, Co., Ltd.) and 3 parts by weight of sodium dodecylbenzenesulfonate ("NEWLEX POWDER F" available from Nippon Oil and Fats Co., Ltd.) (2 parts by weight per 100 parts by weight of the sum of the styrene resin, the polyethylene oxide and the methyl methacrylate resin) were blended in a tumbler for 15 minutes. After the blend, the mixture was molten and mixed in a twin screw extruder ("AS-30" available from NAKATANI Co., Ltd.) and pelletized therein to obtain a sample to be examined.

After drying the sample at 80° C. for 3 hours, the surface intrinsic resistance, Izod impact strength, appearance and resistance to hot water of the sample were determined according to the methods detailed above. The results obtained are summarized in the following Table 1.

EXAMPLES 2 AND 3 AND COMPARATIVE EXAMPLES 1 AND 2

The same procedures used in Example 1 were repeated except that polyethylene oxides having a viscosity-average molecular weight different from that of the polyethylene oxide used in Example 1 were employed to prepare resin compositions and the properties thereof were likewise evaluated. The results obtained are listed in Table 1.

EXAMPLES 4 AND 5 AND COMPARATIVE EXAMPLES 3 AND 4

The same procedures used in Example 1 were repeated except that the polyethylene oxide was used in different amounts to prepare resin compositions and the properties thereof were likewise evaluated. The results obtained are listed in Table 1.

EXAMPLES 6 AND 7 AND COMPARATIVE EXAMPLES 5 AND 6

The same procedures used in Example 1 were repeated except that the methyl methacrylate resin was used in different amounts to prepare resin compositions and the properties thereof were likewise evaluated. The results obtained are listed in Table 1.

EXAMPLES 8 AND 9 AND COMPARATIVE EXAMPLES 7 AND 8

The same procedures used in Example 1 were repeated except that the sodium dodecylbenzenesulfonate was used in different amounts to prepare resin compositions and the properties thereof were likewise evaluated. The results obtained are listed in Table 1.

After drying the sample at 80° C. for 3 hours, the surface intrinsic resistance, Izod impact strength, appearance and resistance to hot water of the sample were determined according to the methods explained above. The results obtained are summarized in the following Table 2.

EXAMPLES 11 AND 12 AND COMPARATIVE

TABLE 1

| | Example No. | | | | | | | | |
|---|---|---|---|---|---|---|---|---|---|
| | 1 | 2 | 3 | 4 | 5 | 6 | 7 | 8 | 9 |
| Resin Composition | | | | | | | | | |
| Styrene Resin Content (part by weight) *A | 100 | 100 | 100 | 100 | 100 | 100 | 100 | 100 | 100 |
| Polyethylene Oxide | | | | | | | | | |
| Viscosity-average molecular weight ($\times 10^4$) | 30 | 110 | 15 | 30 | 30 | 30 | 30 | 30 | 30 |
| Content (part by weight) *B | 10 | 10 | 10 | 5 | 30 | 10 | 10 | 10 | 10 |
| Methyl methacrylate resin content (part by weight) *C | 40 | 40 | 40 | 40 | 40 | 5 | 80 | 40 | 40 |
| Sulfonic Acid Salt Content (wt % based on *A + *B + *C) | 2 | 2 | 2 | 2 | 2 | 2 | 2 | 0.5 | 4 |
| Physical Properties | | | | | | | | | |
| Surface Intrinsic Resistance ($\Omega$) | | | | | | | | | |
| Immediately After Molding | $7 \times 10^9$ | $1 \times 10^{11}$ | $8 \times 10^{10}$ | $7 \times 10^{11}$ | $9 \times 10^9$ | $8 \times 10^9$ | $6 \times 10^{10}$ | $7 \times 10^{11}$ | $3 \times 10^9$ |
| After allowing to Stand for 150 days | $3 \times 10^9$ | $1 \times 10^{11}$ | $6 \times 10^{10}$ | $8 \times 10^{11}$ | $6 \times 10^9$ | $7 \times 10^9$ | $9 \times 10^{10}$ | $8 \times 10^{11}$ | $6 \times 10^9$ |
| Izod Impact Strength (kg · cm/cm) | 12 | 11 | 12 | 13 | 10 | 13 | 10 | 12 | 12 |
| Appearance of Molded Product (change of color; silver streak) | good | good | good | good | good | good | good | good | good |
| Resistance to Hot Water | good | good | good | good | good | good | good | good | good |

| | Comparative Example No. | | | | | | | |
|---|---|---|---|---|---|---|---|---|
| | 1 | 2 | 3 | 4 | 5 | 6 | 7 | 8 |
| Resin Composition | | | | | | | | |
| Styrene Resin Content (part by weight) *A | 100 | 100 | 100 | 100 | 100 | 100 | 100 | 100 |
| Polyethylene Oxide | | | | | | | | |
| Viscosity-average molecular weight ($\times 10^4$) | 1 | 130 | 30 | 30 | 30 | 30 | 30 | 30 |
| Content (part by weight) *B | 10 | 10 | 2 | 40 | 10 | 10 | 10 | 10 |
| Methyl methacrylate resin content (part by weight) *C | 40 | 40 | 40 | 40 | 3 | 120 | 40 | 40 |
| Sulfonic Acid Salt Content (wt % based on *A + *B + *C) | 2 | 2 | 2 | 2 | 2 | 2 | 0.2 | 7 |
| Physical Properties | | | | | | | | |
| Surface Intrinsic Resistance ($\Omega$) | | | | | | | | |
| Immediately After Molding | $3 \times 10^{15}$ | $7 \times 10^{13}$ | $8 \times 10^{14}$ | $7 \times 10^9$ | $4 \times 10^9$ | $6 \times 10^{13}$ | $7 \times 10^{13}$ | $6 \times 10^9$ |
| After allowing to Stand for 150 days | $5 \times 10^{15}$ | $5 \times 10^{14}$ | $8 \times 10^{15}$ | $3 \times 10^9$ | $2 \times 10^{10}$ | $7 \times 10^{15}$ | $5 \times 10^{14}$ | $1 \times 10^9$ |
| Izod Impact Strength (kg · cm/cm) | 12 | 9 | 13 | 4 | 13 | 8 | 12 | 12 |
| Appearance of Molded Product (change of color; silver streak) | good | good | good | good | good | good | good | no good |
| Resistance to Hot Water | good | good | good | good | no good | good | good | good |

EXAMPLE 10

A mixture of 100 parts by weight of a styrene resin ("SANTAC ST-42" available from MITSUI TOATSU CHEMICALS, INC.), 10 parts by weight of a polyethylene oxide having a viscosity-average molecular weight of 200,000 ("ALKOX R-400" available from MEISEI CHEMICAL INDUSTRIES, LTD.), 40 parts by weight of a methyl methacrylate resin ("PARAPET HR" available from Kyowa Gas Chemicals, Co., Ltd.) and 3 parts by weight of sodium dodecylbenzenesulfonate ("NEWLEX POWDER F" available from Nippon Oil and Fats Co., Ltd.) (2 parts by weight per 100 parts by weiqht Of the sum of the styrene resin, the polyethylene oxide and the methyl methacrylate resin) were blended in a tumbler for 15 minutes. After the blend, the mixture was molten and mixed in a twin screw extruder ("AS-30" available from NAKATANI Co., Ltd.) and pelletized therein to obtain a sample to be examined.

EXAMPLES 9 AND 10

The same procedures used in Example 10 were repeated except that polyethylene oxides havinq a viscosity-average molecular weight different from that of the polyethylene oxide used in Example 10 were employed to prepare resin compositions and the properties thereof were likewise evaluated. The results obtained are listed in Table 2.

EXAMPLES 13 AND 14 AND COMPARATIVE EXAMPLES 11 AND 12

The same procedures used in Example 10 were repeated except that the polyethylene oxide was used in different amounts to prepare resin compositions and the properties thereof were likewise evaluated. The results obtained are listed in Table 2.

EXAMPLES 15 AND 16 AND COMPARATIVE EXAMPLES 13 AND 14

The same procedures used in Example 10 were repeated except that the methyl methacrylate resin was used in different amounts to prepare resin compositions and the properties thereof were likewise evaluated. The results obtained are listed in Table 2.

EXAMPLES 17 AND 18 AND COMPARATIVE EXAMPLES 15 AND 16

The same procedures used in Example 10 were repeated except that the sodium dodecylbenzenesulfonate was used in different amounts to prepare resin compositions and the properties thereof were likewise evaluated. The results obtained are listed in Table 2.

parts by weight of the resin composition) and 1.5 part by weight of a polyethylene glycol ("PEG 200" available from Nippon Oil and Fats Co., Ltd.) (one part by weight per 100 parts by weight of the resin composition) were blended in a tumbler for 15 minutes. After the blend, the mixture was molten and mixed in a twin screw extruder ("AS-30" available from NAKATANI Co., Ltd.) and pelletized therein to obtain a sample to be examined.

After drying the sample at 80° C. for 3 hours, the surface intrinsic resistance, Izod impact strength, appearance and resistance to hot water of the sample were determined according to the aforementioned methods. The results obtained are summarized in the following Table 3.

TABLE 2

| | Example No. | | | | | | | | |
|---|---|---|---|---|---|---|---|---|---|
| | 10 | 11 | 12 | 13 | 14 | 15 | 16 | 17 | 18 |
| Resin Composition | | | | | | | | | |
| Styrene Resin Content (part by weight) *A | 100 | 100 | 100 | 100 | 100 | 100 | 100 | 100 | 100 |
| Polyethylene Oxide | | | | | | | | | |
| Viscosity-average molecular weight ($\times 10^4$) | 20 | 40 | 2 | 20 | 20 | 20 | 20 | 20 | 20 |
| Content (part by weight) *B | 10 | 10 | 10 | 5 | 30 | 10 | 10 | 10 | 10 |
| Methyl methacrylate resin content (part by weight) *C | 40 | 40 | 40 | 40 | 40 | 5 | 80 | 40 | 40 |
| Sulfonic Acid Salt Content (wt % based on *A + *B + *C) | 2 | 2 | 2 | 2 | 2 | 2 | 2 | 0.5 | 4 |
| Physical Properties | | | | | | | | | |
| Surface Intrinsic Resistance (Ω) | | | | | | | | | |
| Immediately After Molding | $2 \times 10^{12}$ | $7 \times 10^{12}$ | $7 \times 10^{12}$ | $9 \times 10^{12}$ | $7 \times 10^{11}$ | $3 \times 10^{11}$ | $8 \times 10^{12}$ | $8 \times 10^{12}$ | $7 \times 10^{11}$ |
| After allowing to Stand for 150 days | $9 \times 10^{12}$ | $8 \times 10^{12}$ | $9 \times 10^{12}$ | $9 \times 10^{12}$ | $9 \times 10^{11}$ | $4 \times 10^{11}$ | $7 \times 10^{12}$ | $8 \times 10^{12}$ | $8 \times 10^{11}$ |
| Izod Impact Strength (kg · cm/cm) | 13 | 13 | 13 | 13 | 10 | 13 | 10 | 12 | 12 |
| Appearance of Molded Product (change of color; silver streak) | good | good | good | good | good | good | good | good | good |
| Resistance to Hot Water | good | good | good | good | good | good | good | good | good |

| | Comparative Example No. | | | | | | | |
|---|---|---|---|---|---|---|---|---|
| | 9 | 10 | 11 | 12 | 13 | 14 | 15 | 16 |
| Resin Composition | | | | | | | | |
| Styrene Resin Content (part by weight) *A | 100 | 100 | 100 | 100 | 100 | 100 | 100 | 100 |
| Polyethylene Oxide | | | | | | | | |
| Viscosity-average molecular weight ($\times 10^4$) | 1 | 130 | 20 | 20 | 20 | 20 | 20 | 20 |
| Content (part by weight) *B | 10 | 10 | 2 | 40 | 10 | 10 | 10 | 10 |
| Methyl methacrylate resin content (part by weight) *C | 40 | 40 | 40 | 40 | 3 | 120 | 40 | 40 |
| Sulfonic Acid Salt Content (wt % based on *A + *B + *C) | 2 | 2 | 2 | 2 | 2 | 2 | 0.2 | 7 |
| Physical Properties | | | | | | | | |
| Surface Intrinsic Resistance (Ω) | | | | | | | | |
| Immediately After Molding | $6 \times 10^{16}$ | $9 \times 10^{16}$ | $7 \times 10^{16}$ | $8 \times 10^{11}$ | $1 \times 10^{11}$ | $4 \times 10^{15}$ | $7 \times 10^{15}$ | $3 \times 10^{11}$ |
| After allowing to Stand for 150 days | $8 \times 10^{16}$ | $6 \times 10^{16}$ | $9 \times 10^{16}$ | $6 \times 10^{11}$ | $7 \times 10^{11}$ | $1 \times 10^{16}$ | $5 \times 10^{16}$ | $8 \times 10^{11}$ |
| Izod Impact Strength (kg · cm/cm) | 12 | 9 | 13 | 4 | 13 | 8 | 12 | 12 |
| Appearance of Molded Product (change of color; silver streak) | good | good | good | good | no good | good | good | no good |
| Resistance to Hot Water | good | good | good | good | no good | good | good | good |

EXAMPLE 19

A resin composition of 100 parts by weight of a styrene resin ("SANTAC ST-42" available from MITSUI TOATSU CHEMICALS, INC.), 10 parts by weight of a polyethylene oxide having a viscosity-average molecular weight of 200,000 ("ALKOX R-400" available from MEISEI CHEMICAL INDUSTRIES, LTD.) and 40 parts by weight of a (meth)acrylate resin ("PARAPET GF" available from KURARAY Co., Ltd.) as well as 3 parts by weight of sodium dodecylbenzenesulfonate ("NEWLEX POWDER F" available from Nippon Oil and Fats Co., Ltd.) (2 parts by weight per 100

EXAMPLES 20 AND 21 AND COMPARATIVE EXAMPLES 17 AND 18

The same procedures used in Example 19 were repeated except that polyethylene oxides having a viscosity-average molecular weight different from that of the polyethylene oxide used in Example 19 were employed to prepare resin compositions and the properties thereof were likewise evaluated. The results obtained are listed in Table 3.

EXAMPLES 22 AND 23 AND COMPARATIVE EXAMPLES 19 AND 20

The same procedures used in Example 19 were repeated except that the polyethylene oxide was used in different amounts to prepare resin compositions and the properties thereof were likewise evaluated. The results obtained are listed in Table 3.

EXAMPLES 24 AND 25 AND COMPARATIVE EXAMPLES 21 AND 22

The same procedures used in Example 19 were repeated except that the (meth)acrylate resin was used in different amounts to prepare resin compositions and the properties thereof were likewise evaluated. The results obtained are listed in Table 3.

EXAMPLES 26 AND 27 AND COMPARATIVE EXAMPLES 23 AND 24

The same procedures used in Example 19 were repeated except that the sodium dodecylbenzenesulfonate was used in different amounts to prepare resin compositions and the properties thereof were likewise evaluated. The results obtained are listed in Table 3.

EXAMPLES 28 AND 29 AND COMPARATIVE EXAMPLE 25

The same procedures used in Example 19 were repeated except that different kinds of (poly)ethylene glycols were used to prepare resin compositions and the properties thereof were likewise evaluated. The results obtained are listed in Table 3.

EXAMPLES 30 AND 31 AND COMPARATIVE EXAMPLES 26 AND 27

The same procedures used in Example 19 were repeated except that the (poly)ethylene glycol was used in different amounts to prepare resin compositions and the properties thereof were likewise evaluated. The results obtained are listed in Table 3.

TABLE 3

| | Example No. | | | | | | | | |
|---|---|---|---|---|---|---|---|---|---|
| | 19 | 20 | 21 | 22 | 23 | 24 | 25 | 26 | 27 |
| Resin Composition | | | | | | | | | |
| Styrene Resin Content (part by weight) *A | 100 | 100 | 100 | 100 | 100 | 100 | 100 | 100 | 100 |
| Polyethylene Oxide | | | | | | | | | |
| Viscosity-average molecular weight ($\times 10^4$) | 20 | 40 | 2 | 20 | 20 | 20 | 20 | 20 | 20 |
| Content (part by weight) *B | 10 | 10 | 10 | 5 | 30 | 10 | 10 | 10 | 10 |
| (Meth)acrylate resin content (part by weight) *C | 40 | 40 | 40 | 40 | 40 | 5 | 80 | 40 | 40 |
| Sulfonic Acid Salt Content (wt % based on *A + *B + *C) | 2 | 2 | 2 | 2 | 2 | 2 | 2 | 0.5 | 4 |
| (Poly)Ethylene Glycol | | | | | | | | | |
| Kind | PEG200 | PEG200 | PEG200 | PEG200 | PEG200 | PEG200 | PEG200 | PEG200 | PEG200 |
| Content (wt % based on *A + *B + *C) | 1 | 1 | 1 | 1 | 1 | 1 | 1 | 1 | 1 |
| Physical Properties | | | | | | | | | |
| Surface Intrinsic Resistance ($\Omega$) | | | | | | | | | |
| Immediately After Molding | $3 \times 10^9$ | $8 \times 10^{10}$ | $5 \times 10^{10}$ | $2 \times 10^{11}$ | $8 \times 10^9$ | $8 \times 10^9$ | $1 \times 10^{10}$ | $8 \times 10^{10}$ | $2 \times 10^9$ |
| After allowing to Stand for 150 days | $2 \times 10^9$ | $7 \times 10^{10}$ | $5 \times 10^{10}$ | $5 \times 10^{11}$ | $5 \times 10^9$ | $6 \times 10^9$ | $1 \times 10^{10}$ | $2 \times 10^{11}$ | $5 \times 10^9$ |
| Izod Impact Strength (kg · cm/cm) | 12 | 12 | 13 | 13 | 10 | 13 | 10 | 12 | 12 |
| Vical Softening Point (°C.) | 105 | 105 | 104 | 105 | 103 | 104 | 105 | 105 | 103 |
| Appearance of Molded Product (change of color; silver streak) | good | good | good | good | good | good | good | good | good |
| Resistance to Hot Water | good | good | good | good | good | good | good | good | good |

| | Example No. | | | | Comparative Example No. | | | | |
|---|---|---|---|---|---|---|---|---|---|
| | 28 | 29 | 30 | 31 | 17 | 18 | 19 | 20 | 21 |
| Resin Composition | | | | | | | | | |
| Styrene Resin Content (part by weight) *A | 100 | 100 | 100 | 100 | 100 | 100 | 100 | 100 | 100 |
| Polyethylene Oxide | | | | | | | | | |
| Viscosity-average molecular weight ($\times 10^4$) | 20 | 20 | 20 | 20 | 130 | 1 | 20 | 20 | 20 |
| Content (part by weight) *B | 10 | 10 | 10 | 10 | 10 | 10 | 2 | 40 | 10 |
| (Meth)acrylate resin content (part by weight) *C | 40 | 40 | 40 | 40 | 40 | 40 | 40 | 40 | 3 |
| Sulfonic Acid Salt Content (wt % based on *A + *B + *C) | 2 | 2 | 2 | 2 | 2 | 2 | 2 | 2 | 2 |
| (Poly)Ethylene Glycol | | | | | | | | | |
| Kind | | PEG1000 | PEG200 | PEG200 | PEG200 | PEG200 | PEG200 | PEG200 | PEG200 |
| Content (wt % based on *A + *B + *C) | 1 | 1 | 0.1 | 1 | 1 | 1 | 1 | 1 | 1 |
| Physical Properties | | | | | | | | | |
| Surface Intrinsic Resistance ($\Omega$) | | | | | | | | | |
| Immediately After Molding | $1 \times 10^9$ | $8 \times 10^{11}$ | $8 \times 10^{11}$ | $6 \times 10^9$ | $5 \times 10^{16}$ | $9 \times 10^{15}$ | $5 \times 10^{15}$ | $5 \times 10^9$ | $5 \times 10^9$ |
| After allowing to Stand for 150 days | $1 \times 10^9$ | $9 \times 10^{11}$ | $4 \times 10^{11}$ | $6 \times 10^9$ | $1 \times 10^{16}$ | $8 \times 10^{15}$ | $8 \times 10^{15}$ | $8 \times 10^9$ | $1 \times 10^{10}$ |
| Izod Impact Strength (kg · cm/cm) | 12 | 13 | 13 | 10 | 9 | 13 | 13 | 4 | 13 |
| Vical Softening Point (°C.) | 102 | 105 | 105 | 100 | 105 | 103 | 105 | 102 | 104 |
| Appearance of Molded Product (change of color; silver streak) | good | good | good | good | good | good | good | good | good |
| Resistance to Hot Water | good | good | good | good | good | good | good | good | no good |

TABLE 3-continued

| | Comparative Example No. | | | | | |
|---|---|---|---|---|---|---|
| | 22 | 23 | 24 | 25 | 26 | 27 |
| Resin Composition | | | | | | |
| Styrene Resin Content (part by weight) *A | 100 | 100 | 100 | 100 | 100 | 100 |
| Polyethylene Oxide | | | | | | |
| Viscosity-average molecular weight ($\times 10^4$) | 20 | 20 | 20 | 20 | 20 | 20 |
| Content (part by weight) *B | 10 | 10 | 10 | 10 | 10 | 10 |
| (Meth)acrylate resin content (part by weight) *C | 120 | 40 | 40 | 40 | 40 | 40 |
| Sulfonic Acid Salt Content (wt % based on *A + *B + *C) | 2 | 0.2 | 7 | 2 | 2 | 2 |
| (Poly)Ethylene Glycol | | | | | | |
| Kind | PEG200 | PEG200 | PEG200 | PEG4000 | — | PEG200 |
| Content (wt % based on *A + *B + *C) | 1 | 1 | 1 | 1 | 0 | 7 |
| Physical Properties | | | | | | |
| Surface Intrinsic Resistance ($\Omega$) | | | | | | |
| Immediately After Molding | $7 \times 10^{13}$ | $3 \times 10^{13}$ | $3 \times 10^9$ | $5 \times 10^{12}$ | $2 \times 10^{12}$ | $7 \times 10^9$ |
| After allowing to Stand for 150 days | $5 \times 10^{15}$ | $5 \times 10^{14}$ | $1 \times 10^9$ | $8 \times 10^{12}$ | $9 \times 10^{12}$ | $1 \times 10^9$ |
| Izod Impact Strength (kg · cm/cm) | 8 | 12 | 12 | 13 | 13 | 9 |
| Vical Softening Point (°C.) | 105 | 105 | 102 | 105 | 105 | 96 |
| Appearance of Molded Product (change of color; silver streak) | good | good | no good | good | good | good |
| Resistance to Hot Water | good | good | good | good | good | good |

EXAMPLE 32

A mixture of 100 parts by weight of a styrene resin ("SANTAC ST-42" available from MITSUI TOATSU CHEMICALS, INC.), 10 parts by weight of a polyethylene oxide having a viscosity-average molecular weight of 200,000 ("ALKOX R-400" available from MEISEI CHEMICAL INDUSTRIES, LTD.), 40 parts by weight of a (meth)acrylate resin ("PARAPET GF" available from KURARAY Co., Ltd.) and 3 parts by weiqht of sodium n-dodecyl sulfate (available from Kanto Chemical Co., Ltd.) (2 parts by weight per 100 parts by weight of the sum of the styrene resin, the polyethylene oxide and the (meth) acrylate resin) were blended in a tumbler for 15 minutes. After the blend, the mixture was molten and mixed in a twin screw extruder ("AS-30" available from NAKATANI Co., Ltd.) and pelletized therein to obtain a sample to be examined.

After drying the sample at 80° C. for 3 hours, the surface intrinsic resistance, Izod impact strength, appearance and resistance to hot water of the sample were determined according to the aforementioned methods. The results obtained are summarized in the following Table 4.

EXAMPLES 33 AND 34 AND COMPARATIVE EXAMPLES 28 AND 29

The same procedures used in Example 32 were repeated except that polyethylene oxides having a viscosity-average molecular weight different from that of the polyethylene oxide used in Example 32 were employed to prepare resin compositions and the properties thereof were likewise evaluated. The results obtained are listed in Table 4.

EXAMPLES 35 AND 36 AND COMPARATIVE EXAMPLES 30 AND 31

The same procedures used in Example 32 were repeated except that the polyethylene oxide was used in different amounts to prepare resin compositions and the properties thereof were likewise evaluated. The results obtained are listed in Table 4.

EXAMPLES 37 AND 38 AND COMPARATIVE EXAMPLES 32 AND 33

The same procedures used in Example 32 were repeated except that the (meth)acrylate resin was used in different amounts to prepare resin compositions and the properties thereof were likewise evaluated. The results obtained are listed in Table 4.

EXAMPLES 39 AND 40 AND COMPARATIVE EXAMPLES 34 AND 35

The same procedures used in Example 32 were repeated except that the sodium n-dodecyl sulfate was used in different amounts to prepare resin compositions and the properties thereof were likewise evaluated. The results obtained are listed in Table 4.

TABLE 4

| | Example No. | | | | | | | | |
|---|---|---|---|---|---|---|---|---|---|
| | 32 | 33 | 34 | 35 | 36 | 37 | 38 | 39 | 40 |
| Resin Composition | | | | | | | | | |
| Styrene Resin Content (part by weight) *A | 100 | 100 | 100 | 100 | 100 | 100 | 100 | 100 | 100 |
| Polyethylene Oxide | | | | | | | | | |
| Viscosity-average molecular weight ($\times 10^4$) | 20 | 40 | 2 | 20 | 20 | 20 | 20 | 20 | 20 |
| Content (part by weight) *B | 10 | 10 | 10 | 5 | 30 | 10 | 10 | 10 | 10 |
| (Meth)acrylate Resin Content (part by weight) *C | 40 | 40 | 40 | 40 | 40 | 5 | 80 | 40 | 40 |
| Sodium n-dodecyl Sulfate Content (wt % based on *A + *B + *C) | 2 | 2 | 2 | 2 | 2 | 2 | 2 | 0.5 | 4 |

TABLE 4-continued

| Physical Properties Surface Intrinsic Resistance (Ω) | | | | | | | | | |
|---|---|---|---|---|---|---|---|---|---|
| Immediately After Molding | $2 \times 10^9$ | $4 \times 10^{10}$ | $8 \times 10^{10}$ | $4 \times 10^{11}$ | $6 \times 10^9$ | $3 \times 10^9$ | $4 \times 10^{10}$ | $6 \times 10^{10}$ | $3 \times 10^9$ |
| After allowing to Stand for 150 days | $2 \times 10^9$ | $8 \times 10^{10}$ | $6 \times 10^{11}$ | $6 \times 10^{11}$ | $9 \times 10^9$ | $8 \times 10^9$ | $2 \times 10^{10}$ | $8 \times 10^{10}$ | $2 \times 10^9$ |
| Izod Impact Strength (kg · cm/cm) | 12 | 12 | 13 | 13 | 10 | 13 | 10 | 13 | 12 |
| Appearance of Molded Product (change of color; silver streak) | good | good | good | good | good | good | good | good | good |
| Resistance to Hot Water | good | good | good | good | good | good | good | good | good |

| | Comparative Example No. | | | | | | | |
|---|---|---|---|---|---|---|---|---|
| | 28 | 29 | 30 | 31 | 32 | 33 | 34 | 35 |
| Resin Composition | | | | | | | | |
| Styrene Resin Content (part by weight) *A | 100 | 100 | 100 | 100 | 100 | 100 | 100 | 100 |
| Polyethylene Oxide | | | | | | | | |
| Viscosity-average molecular weight ($\times 10^4$) | 130 | 1 | 20 | 20 | 20 | 20 | 20 | 20 |
| Content (part by weight) *B | 10 | 10 | 2 | 40 | 10 | 10 | 10 | 10 |
| (Meth)acrylate resin content (part by weight) *C | 40 | 40 | 40 | 40 | 3 | 120 | 40 | 40 |
| Sodium n-dodecyl Sulfate Content (wt % based on *A + *B + *C) | 2 | 2 | 2 | 2 | 2 | 2 | 0.2 | 7 |
| Physical Properties | | | | | | | | |
| Surface Intrinsic Resistance (Ω) | | | | | | | | |
| Immediately After Molding | $7 \times 10^{15}$ | $5 \times 10^{15}$ | $7 \times 10^{15}$ | $5 \times 10^9$ | $5 \times 10^9$ | $4 \times 10^{14}$ | $4 \times 10^{14}$ | $5 \times 10^9$ |
| After allowing to Stand for 150 days | $4 \times 10^{15}$ | $8 \times 10^{15}$ | $9 \times 10^{15}$ | $7 \times 10^9$ | $9 \times 10^9$ | $4 \times 10^{15}$ | $6 \times 10^{15}$ | $1 \times 10^9$ |
| Izod Impact Strength (kg · cm/cm) | 9 | 13 | 13 | 4 | 13 | 8 | 12 | 12 |
| Appearance of Molded Product (change of color; silver streak) | good | good | good | good | good | good | good | no good |
| Resistance to Hot Water | good | good | good | good | no good | good | good | good |

EXAMPLE 41

A mixture of 100 parts by weight of a styrene resin ("SANTAC ST-42" available from MITSUI TOATSU CHEMICALS, INC.), 10 parts by weight of a polyethylene oxide having a viscosity-average molecular weight of 200,000 ("ALKOX R-400" available from MEISEI CHEMICAL INDUSTRIES, LTD.), 2.2 parts by weight of sodium dodecylbenzenesulfonate ("NEWLEX POWDER F" available from Nippon Oil and Fats Co., Ltd.) and 2.2 parts by weight of titanium oxide ("Titanium Dioxide" available from Kanto Chemical Co., Ltd.) were blended in a tumbler for 15 minutes. After the blend, the mixture was molten and mixed in a twin screw extruder ("AS-30" available from NAKATANI Co., Ltd.) and pelletized therein to obtain a sample to be examined.

After drying the sample at 80° C. for 3 hours, the surface intrinsic resistance, Izod impact strength, appearance and resistance to hot water of the sample were determined according to the aforementioned methods. The results obtained are summarized in the following Table 5.

EXAMPLES 42 AND 43 AND COMPARATIVE EXAMPLES 36 AND 37

The same procedures used in Example 41 were repeated except that polyethylene oxides havinq a viscosity-average molecular weight different from that of the polyethylene oxide used in Example 41 were employed to prepare resin compositions and the properties thereof were likewise evaluated. The results obtained are listed in Table 5.

EXAMPLES 44 AND 45 AND COMPARATIVE EXAMPLES 38 AND 39

The same procedures used in Example 41 were repeated except that the polyethylene oxide was used in different amounts to prepare resin compositions and the properties thereof were likewise evaluated. The results obtained are listed in Table 5.

EXAMPLES 46 AND 47 AND COMPARATIVE EXAMPLES 40 AND 41

The same procedures used in Example 41 were repeated except that the sodium dodecylbenzenesulfonate was used in different amounts to prepare resin compositions and the properties thereof were likewise evaluated. The results obtained are listed in Table 5.

EXAMPLES 48 AND 49 AND COMPARATIVE EXAMPLES 42 AND 43

The same procedures used in Example 41 were repeated except that the titanium oxide was used in different amounts to prepare resin compositions and the properties thereof were likewise evaluated. The results obtained are listed in Table 5.

EXAMPLES 50 AND 51

The same procedures used in Example 41 were repeated except that zinc oxide or a mixture of titanium oxide and zinc oxide was substituted for the titanium oxide used in Example 41 to prepare resin compositions and the properties thereof were likewise evaluated. The results obtained are listed in Table 5.

TABLE 5

| | Example No. | | | | | |
|---|---|---|---|---|---|---|
| | 41 | 42 | 43 | 44 | 45 | 46 |
| Resin Composition | | | | | | |
| Styrene Resin Content (part by weight) *A | 100 | 100 | 100 | 100 | 100 | 100 |
| Polyethylene Oxide | | | | | | |

TABLE 5-continued

| | | | | | | |
|---|---|---|---|---|---|---|
| Viscosity-average molecular weight ($\times 10^4$) | 20 | 40 | 2 | 20 | 20 | 20 |
| Content (part by weight) *B | 10 | 10 | 10 | 5 | 30 | 10 |
| Sulfonic Acid Salt Content (wt % based on *A + *B + *C) | 2 | 2 | 2 | 2 | 2 | 0.5 |
| Titanium Oxide Content (part by weight per 100 parts by weight of *A + *B) *C | 2 | 2 | 2 | 2 | 2 | 2 |
| Zinc Oxide Content (part by weight per 100 parts by weight of *A + *B) *C | 0 | 0 | 0 | 0 | 0 | 0 |
| Physical Properties | | | | | | |
| Surface Intrinsic Resistance (Ω) | | | | | | |
| Immediately After Molding | $8 \times 10^9$ | $9 \times 10^{10}$ | $4 \times 10^{10}$ | $7 \times 10^{11}$ | $7 \times 10^9$ | $6 \times 10^{11}$ |
| After allowing to Stand for 150 days | $1 \times 10^{10}$ | $2 \times 10^{11}$ | $4 \times 10^{10}$ | $9 \times 10^{11}$ | $5 \times 10^9$ | $6 \times 10^{11}$ |
| Izod Impact Strength (kg · cm/cm) | 11 | 10 | 11 | 12 | 10 | 11 |
| Appearance of Molded Product (change of color; silver streak) | good | good | good | good | good | good |
| Resistance to Hot Water | good | good | good | good | good | good |

| | Example No. | | | | |
|---|---|---|---|---|---|
| | 47 | 48 | 49 | 50 | 51 |
| Resin Composition | | | | | |
| Styrene Resin Content (part by weight) *A | 100 | 100 | 100 | 100 | 100 |
| Polyethylene Oxide | | | | | |
| Viscosity-average molecular weight ($\times 10^4$) | 20 | 20 | 20 | 20 | 20 |
| Content (part by weight) *B | 10 | 10 | 10 | 10 | 10 |
| Sulfonic Acid Salt Content (wt % based on *A + *B + *C) | 4 | 2 | 2 | 2 | 2 |
| Titanium Oxide Content (part by weight per 100 parts by weight of *A + *B) *C | 2 | 1 | 4 | 0 | 1 |
| Zinc Oxide Content (part by weight per 100 parts by weight of *A + *B) *C | 0 | 0 | 0 | 2 | 1 |
| Physical Properties | | | | | |
| Surface Intrinsic Resistance (Ω) | | | | | |
| Immediately After Molding | $6 \times 10^9$ | $4 \times 10^9$ | $4 \times 10^9$ | $7 \times 10^9$ | $7 \times 10^9$ |
| After allowing to Stand for 150 days | $8 \times 10^9$ | $1 \times 10^{10}$ | $8 \times 10^9$ | $4 \times 10^9$ | $8 \times 10^9$ |
| Izod Impact Strength (kg · cm/cm) | 11 | 12 | 10 | 11 | 11 |
| Appearance of Molded Product (change of color; silver streak) | good | good | good | good | good |
| Resistance to Hot Water | good | good | good | good | good |

| | Comparative Example No. | | | | | | | |
|---|---|---|---|---|---|---|---|---|
| | 36 | 37 | 38 | 39 | 40 | 41 | 42 | 43 |
| Resin Composition | | | | | | | | |
| Styrene Resin Content (part by weight) *A | 100 | 100 | 100 | 100 | 100 | 100 | 100 | 100 |
| Polyethylene Oxide | | | | | | | | |
| Viscosity-average molecular weight ($\times 10^4$) | 130 | 1 | 20 | 20 | 20 | 20 | 20 | 20 |
| Content (part by weight) *B | 10 | 10 | 2 | 40 | 10 | 10 | 10 | 10 |
| Sulfonic Acid Salt Content (wt % based on *A + *B + *C) | 2 | 2 | 2 | 2 | 0.2 | 7 | 2 | 2 |
| Titanium Oxide Content (part by weight per 100 parts by weight of *A + *B) *C | 2 | 2 | 2 | 2 | 2 | 2 | 0.5 | 7 |
| Zinc Oxide Content (part by weight per 100 parts by weight of *A + *B) *C | 0 | 0 | 0 | 0 | 0 | 0 | 0 | 0 |
| Surface Intrinsic Resistance (Ω) | | | | | | | | |
| Immediately After Molding | $4 \times 10^{15}$ | $7 \times 10^{15}$ | $1 \times 10^{15}$ | $4 \times 10^9$ | $2 \times 10^{14}$ | $1 \times 10^9$ | $6 \times 10^9$ | $8 \times 10^9$ |
| After allowing to Stand for 150 days | $7 \times 10^{15}$ | $9 \times 10^{15}$ | $6 \times 10^{14}$ | $1 \times 10^9$ | $8 \times 10^{13}$ | $6 \times 10^9$ | $1 \times 10^{10}$ | $2 \times 10^{10}$ |
| Izod Impact Strength (kg · cm/cm) | 9 | 11 | 11 | 4 | 8 | 11 | 12 | 4 |
| Appearance of Molded Product (change of color; silver streak) | good | good | good | good | good | no good | good | good |
| Resistance to Hot Water | good | good | good | good | good | good | no good | good |

EXAMPLES 52 AND 63

A resin composition comprising 100 parts by weight of a V styrene resin ("SANTAC ST-42" available from MITSUI TOATSU CHEMICALS, INC.), 10 parts by weight of a polyethylene oxide having a viscosity-average molecular weight of 200,000 ("ALKOX R-400" available from MEISEI CHEMICAL INDUSTRIES, LTD.), a (meth)acrylate resin ("PARAPET GF" available from KURARAY CO., LTD.) whose kind and amount are shown in the following Table 6 and an oxide whose kind and amount are shown in the following Table 6 as well as sodium dodecylbenzenesulfonate ("NEWLEX POWDER F" available from Nippon Oil and Fats Co., Ltd.) in an amount listed in Table 6 or sodium n-dodecylbenzenesulfonate whose amount is shown in the following Table 6 (available from Kanto Chemical Co., Ltd.) and a polyethylene glycol ("PEG 200" available from Nippon Oil and Fats Co., Ltd.) whose amount is shown in Table 6 were blended in a tumbler for 15 minutes. After the blend, the mixture was molten and mixed in a twin screw extruder ("AS-30" available from NAKATANI Co., Ltd.) and pelletized therein. Thus, samples to be examined were prepared.

After drying these samples at 80° C. for 3 hours, the surface intrinsic resistance, Izod impact strength, appearance and resistance to hot water of the samples were determined according to the aforementioned methods. The results obtained are summarized in the following Table 6.

TABLE 6

| | Example No. | | | | | |
|---|---|---|---|---|---|---|
| | 52 | 53 | 54 | 55 | 56 | 57 |

TABLE 6-continued

| Resin Composition | | | | | | |
|---|---|---|---|---|---|---|
| Styrene Resin Content (part by weight) *A | 100 | 100 | 100 | 100 | 100 | 100 |
| Polyethylene Oxide | | | | | | |
| Viscosity-average molecular weight ($\times 10^4$) | 20 | 20 | 20 | 20 | 20 | 20 |
| Content (part by weight) *B | 10 | 10 | 10 | 10 | 10 | 10 |
| (Meth)acrylate Resin Content (part by weight) *C | 40 | 40 | 40 | 40 | 40 | 40 |
| Titanium Oxide Content (part by weight per 100 parts by weight of *A + *B) *C | 2 | 0 | 1 | 2 | 2 | 2 |
| Zinc Oxide Content (part by weight per 100 parts by weight of *A + *B) *C | 0 | 0 | 1 | 0 | 0 | 0 |
| Magnesium Oxide Content (part by weight per 100 parts by weight of *A + *B) *C | 0 | 2 | 0 | 0 | 0 | 0 |
| Sulfonic Acid Salt Content (wt % based *A + *B + *C) | 2 | 2 | 2 | 0 | 2 | 0 |
| Alkyl Sulfate Content (wt % based on *A + *B + *C) | 0 | 0 | 0 | 2 | 0 | 2 |
| (Poly)Ethylene Glycol | | | | | | |
| Kind | | | | | PEG200 | PEG200 |
| Content (wt % based on *A + *B + *C) | 0 | 0 | 0 | 0 | 1 | 1 |
| Physical Properties | | | | | | |
| Surface Intrinsic Resistance (Ω) | | | | | | |
| Immediately After Molding | $6 \times 10^{12}$ | $1 \times 10^{12}$ | $7 \times 10^{12}$ | $4 \times 10^9$ | $3 \times 10^9$ | $4 \times 10^9$ |
| After allowing to Stand for 150 days | $3 \times 10^{12}$ | $7 \times 10^{12}$ | $6 \times 10^{12}$ | $3 \times 10^9$ | $3 \times 10^9$ | $5 \times 10^9$ |
| Izod Impact Strength (kg · cm/cm) | 12 | 12 | 12 | 12 | 12 | 12 |
| Vicat Softening Point (°C.) | 105 | 105 | 105 | 105 | 105 | 105 |
| Appearance of Molded Product (change of color; silver streak) | good | good | good | good | good | good |
| Resistance to Hot Water | good | good | good | good | good | good |

| | Example No. | | | | | |
|---|---|---|---|---|---|---|
| | 58 | 59 | 60 | 61 | 62 | 63 |
| Resin Composition | | | | | | |
| Styrene Resin Content (part by weight) *A | 100 | 100 | 100 | 100 | 100 | 100 |
| Polyethylene Oxide | | | | | | |
| Viscosity-average molecular weight ($\times 10^4$) | 20 | 20 | 20 | 20 | 20 | 20 |
| Content (part by weight) *B | 10 | 10 | 10 | 10 | 10 | 10 |
| (Meth)acrylate Resin Content (part by weight) *C | 40 | 0 | 0 | 0 | 0 | 0 |
| Titanium Oxide Content (part by weight per 100 parts by weight of *A + *B) *C | 0 | 2 | 2 | 2 | 0 | 1 |
| Zinc Oxide Content (part by weight per 100 parts by weight of *A + *B) *C | 0 | 0 | 0 | 0 | 0 | 0.5 |
| Magnesium Oxide Content (part by weight per 100 parts by weight of *A + *B) *C | 0 | 0 | 0 | 0 | 2 | 0.5 |
| Sulfonic Acid Salt Content (wt % based *A + *B + *C) | 0 | 0 | 0 | 2 | 2 | 2 |
| Alkyl Sulfate Content (wt % based on *A + *B + *C) | 2 | 2 | 2 | 0 | 0 | 0 |
| (Poly)Ethylene Glycol | | | | | | |
| Kind | PEG200 | | PEG200 | PEG200 | | |
| Content (wt % based on *A + *B + *C) | 1 | 0 | 1 | 1 | 0 | 0 |
| Physical Properties | | | | | | |
| Surface Intrinsic Resistance (Ω) | | | | | | |
| Immediately After Molding | $6 \times 10^9$ | $1 \times 10^9$ | $6 \times 10^9$ | $4 \times 10^9$ | $8 \times 10^9$ | $7 \times 10^9$ |
| After allowing to Stand for 150 days | $1 \times 10^9$ | $8 \times 10^9$ | $6 \times 10^9$ | $6 \times 10^9$ | $6 \times 10^9$ | $1 \times 10^{10}$ |
| Izod Impact Strength (kg · cm/cm) | 12 | 12 | 12 | 12 | 12 | 12 |
| Vicat Softening Point (°C.) | 105 | 105 | 105 | 105 | 105 | 105 |
| Appearance of Molded Product (change of color; silver streak) | good | good | good | good | good | good |
| Resistance to Hot Water | good | good | good | good | good | good |

As seen from the results set forth in Tables 1 to 6, the resin Composition of the present invention can provide excellent antistatic properties and substantially improved practical physical properties.

What is claimed is:

1. A resin molding composition having excellent antistatic properties comprising:
   (i) a styrene resin selected from the group consisting of homopolymers of a styrene compound selected from the group of styrene and derivatives thereof, copolymers of at least two such styrene compounds and copolymers of a styrene compound with other copolymerizable monomers;
   (ii) 3 to 35 parts by weight based on 100 parts by weight of styrene resin of a polyethylene oxide having a viscosity-average molecular weight ranging from 15,000 to 1,200,000;
   (iii) either or both of a (meth)acrylate resin in an amount ranging from 4 to 100 parts by weight per 100 parts by weight of the styrene resin, and an oxide selected from the group consisting of titanium oxide, zinc oxide and magnesium oxide in an amount ranging from 0.7 to 5 parts by weight per 100 parts by weight, of the sum of components (i) and (ii); and
   (iv) either a surfactant selected from sulfonic acid salts represented by the formula:

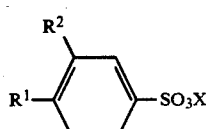

wherein $R^1$ and $R^2$ each represents a hydrogen atom or an alkyl group having not more than 12 carbon atoms and X represents at least one alkali metal selected from the group consisting of Na, Li and K or an alkyl sulfate represented by the formula:

$$R^3\text{---}OSO_3M$$

wherein $R^3$ represents an alkyl group having 8 to 20 carbon atoms and M represents at least one ion selected form the group consisting of K, Na and NH$_4$, in an amount ranging from 0.4 to 5 parts by weight per 100 parts by weight of the sum of the components (i), (ii) and (iii) and wherein components (ii), (iii), and (iv) are mixed into the styrene resin to form said resin molding composition.

2. A resin molding composition according to claim 1 wherein the styrene resin is a homopolymer derived form a styrene compound selected from the group consisting of styrene, α-methyls-tyrene, α-ethylstyrene, vinyl toluene, p-methylstyrene, monochlorostyrene, dichlorostyrene, tribromostyrene and tetrabromostyrene.

3. A resin molding composition according to claim 2 wherein the styrene resin is a homopolymer derived from a styrene compound selected from the group consisting of styrene and α-methylstyrene.

4. A resin molding composition according to claim 1 wherein the polyethylene oxide is one having a viscosity-average molecular weight ranging from 20,000 to 1,000,000.

5. A resin molding composition according to claim 4 wherein the polyethylene oxide is one having a viscosity-average molecular weight ranging from 50,000 to 500,000.

6. A resin molding composition according to claim 5 wherein the polyethylene oxide is one having a viscosity-average molecular weight ranging from 100,000 to 300,000.

7. A resin molding composition according to claim 1 wherein the amount of the polyethylene oxide ranges from 10 to 60 parts by weight.

8. A resin molding composition according to claim 1 wherein component (iii) is a (meth)acrylate resin.

9. A resin molding composition according to claim 8 wherein the (meth)acrylate resin is a homopolymer derived from a (meth) acrylate monomer selected from the group consisting of methyl methacrylate, ethyl methacrylate, propyl methacrylate, butyl methacrylate, methyl acrylate, ethyl acrylate, propyl acrylate and butyl acrylate.

10. A resin molding composition according to claim 9 wherein the (meth)acrylate resin is a homopolymer of methyl methacrylate.

11. A resin molding composition of claim 8 wherein the amount of the (meth)acrylate resin ranges from 10 to 60 parts by weight.

12. A resin molding composition according to claim 1 wherein the component (iii) includes an oxide selected from the group consisting of titanium oxide, zinc oxide and magnesium oxide.

13. A resin molding composition according to claim 12 wherein the amount of the oxide ranges from 2 to 3 parts by weight per 100 parts by weight of the sum of the components (i) and (ii).

14. A resin molding composition according to claim 1 wherein both (meth)acrylate resin and the oxide are used as the component (iii).

15. A resin molding composition according to claim 1 wherein component (iv) is a sulfonic acid salt.

16. A resin molding composition according to claim 15 wherein the sulfonic acid salt is a member of the group consisting of Na, Li and K salts of benzenesulfonic acid, toluenesulfonic acid, ethylbenzenesulfonic acid, propylbenzenesulfonic acid, isopropylbenzenesulfonic acid, n-butylbenzenesulfonic acid, iso-butylbenzenesulfonic acid, sec-butylbenzenesulfonic acid, tert-butylbenzenesulfonic acid, pentylbenzene-sulfonic acid, dodecylbenzenesulfonic acid, xylenesulfonic acid, ethyltoluenesulfonic acid, cymenesulfonic acid, t-butyltoluenesulfonic acid and diethylbenzenesulfonic acid.

17. A resin molding composition according to claim 15 wherein the amount of sulfonic acid salt ranges from 0.7 to 3 parts by weight per 100 parts by weight of the sum of components (i), (ii) and (iii).

18. A resin molding composition according to claim 1 wherein component (iv) is an alkyl sulfate.

19. A resin molding composition according to claim 18 wherein the alkyl sulfate is a member of the group consisting of sodium octyl sulfate, sodium ethylhexyl sulfate, sodium undecyl sulfate, sodium dodecyl sulfate, potassium dodecyl sulfate, ammonium dodecyl sulfate, sodium hexadecyl sulfate and ammonium octadecyl sulfate.

20. A resin molding composition according to claim 18 wherein the amount of alkyl sulfate ranges from 0.7 to 3 parts by weight per 100 parts by weight of the sum of components (i), (ii) and (iii).

21. A resin molding composition havinq excellent antistatic properties according to claim 1 further comprising :
(v) a (poly)ethylene glycol having an average molecular weight ranging from 62 to 1,200, in an amount of 0.05 to 5 parts by weight per 100 parts by weight of the sum of components (i), (ii) and (iii) of the composition.

22. A resin molding composition according to claim 21 wherein the (poly)ethylene glycol is a member selected from the group consisting of ethylene glycol, diethylene glycol, triethylene glycol and low molecular weight polyethylene glycols having a molecular weight of 200, 300, 400, 600 and 1000, respectively.

23. A resin molding composition according to claim 21 wherein the amount of the (poly)ethylene glycol ranges from 0.3 to 2 parts by weight per 100 parts by weight of the sum of components (i ), (ii) and (iii).

* * * * *

UNITED STATES PATENT AND TRADEMARK OFFICE
CERTIFICATE OF CORRECTION

PATENT NO. : 5,151,457

DATED : September 29, 1992

INVENTOR(S) : Ishida, et. al.

It is certified that error appears in the above-identified patent and that said Letters Patent is hereby corrected as shown below:

Column 23, line 14, delete "form" and insert therefor --from--; and

Column 24, line 38, delete "havinq" and insert therefor --having--.

Signed and Sealed this

Thirtieth Day of November, 1993

Attest:

BRUCE LEHMAN

*Attesting Officer*  *Commissioner of Patents and Trademarks*